United States Patent [19]

Caldwell

[11] Patent Number: 5,727,865
[45] Date of Patent: Mar. 17, 1998

[54] DETACHABLE TRAILER LIGHT

[76] Inventor: Bruce A. Caldwell, 16200 Old River Rd. Loop, Vancleave, Miss. 39565

[21] Appl. No.: 690,770

[22] Filed: Aug. 1, 1996

[51] Int. Cl.$^6$ ................................................ B60Q 1/26
[52] U.S. Cl. ........................ 362/80; 362/61; 362/226; 362/368; 362/375; 362/399; 439/34
[58] Field of Search ..................... 362/61, 80, 80.1, 362/82, 83.3, 226, 368, 374, 375, 399; 340/431, 479; 439/34, 35, 36, 445–447, 680, 681

[56] References Cited

U.S. PATENT DOCUMENTS

| | | | |
|---|---|---|---|
| 3,321,731 | 5/1967 | Goldbaum | 439/34 |
| 4,463,411 | 7/1984 | Proctor | 362/61 |
| 4,703,398 | 10/1987 | Huth | 362/61 |
| 4,800,471 | 1/1989 | Lippert | 362/80 |
| 5,157,591 | 10/1992 | Chudzik | 362/61 |
| 5,302,141 | 4/1994 | O'Reilly et al. | 439/680 |
| 5,414,362 | 5/1995 | Gramling et al. | 340/431 |
| 5,521,806 | 5/1996 | Hutzel et al. | 362/399 |

*Primary Examiner*—Alan Cariaso
*Attorney, Agent, or Firm*—Patent & Trademark Services; Joseph H. McGlynn

[57] ABSTRACT

An improved auxiliary light for automotive trailers with a lamp portion having conventional socket, bulb, and contact components removably received into a bracket or housing mounted on the trailer frame. The lamp portion has locking rails and a slotted upper opening which engage rail guides and the upper face of the bracket or housing, respectively. A looped handle portion is provided on the top of the lamp to facilitate installation and removal. The bracket or housing is secured by screws to the trailer frame. Rail guides on the interior portion of the bracket or housing receive the lock rails on the lamp portion. A 12-volt wire assembly is connected to the trailer light outlet of the vehicle and connects at its other end to electrical contacts of the bracket or housing. The electrical contacts of the lamp engage those of the bracket or housing upon installation and strap closures are provided on the bracket or housing to secure the lamp in place.

5 Claims, 1 Drawing Sheet

DETACHABLE TRAILER LIGHT

BACKGROUND OF THE INVENTION

The present invention relates generally to auxiliary lighting apparatuses for automotive trailers and in particular to a lighting device having a lamp portion installed on and readily detachable from a housing mounted on a trailer.

DESCRIPTION OF THE PRIOR ART

Various auxiliary lighting devices for automobiles and trailers have been disclosed in the prior art. These inventions are designed to provide enhanced illumination during braking, which is often necessary when one is pulling a boat or carrying objects which obstruct the normal lighting system of the car.

A recent example is U.S. Pat. No. 5,157,591, which discloses a lighting system that can be attached to various parts of an automobile or to objects being carried thereon, such as a bicycle. This invention comprises a pair of light assemblies mounted on bracket or housings having lateral projections. The lateral projections are designed to engage a strap for securing the light assembly to the desired object. One shortcoming of the invention, however, is that the desired surface may be flat or otherwise not suited for the strap attachment, resulting in a less than secure fitting of the assembly. The invention is thus not suitable for use on many types of trailers.

A different type of vehicle light attachment is disclosed in U.S. Pat. No. 4,800,471. This invention comprises an elongated shank mount which can be received into the socket of a class II or III trailer hitch. An obvious drawback of this invention, however, is that its use is limited to a particular type of vehicle. It is not adaptable for use on a boat or utility trailer that does not feature the proper hitch socket.

Other prior art light assemblies suffer similar disadvantages. For example, U.S. Pat. Nos. 4,463,411 and 4,703,398 disclose auxiliary lights for use in the rear windows of automobiles. These clearly do not provide sufficient illumination for a trailer being pulled behind the vehicle.

Clearly, there remains a need for an auxiliary trailer light which can be used on many different types of trailers. Additionally, there remains a need for an inexpensive trailer light which can be securely installed and quickly removed, and one which provides for easy cleaning of the electrical components, which often become soiled from road travel. As described below, the present invention provides these and other advantages, and alleviates many of the drawbacks of the prior art inventions.

SUMMARY OF THE INVENTION

The present invention is a trailer light assembly, comprising a detachable lamp portion that is received into a mounting bracket or housing affixed to a trailer frame. The lamp portion comprises a parallelpiped shaped housing, the faces of which are formed from translucent, preferably red-colored, lenses. The lamp can be made from hard plastic or some similar material, and can be constructed inexpensively through the process of injection molding. The housing contains a conventional bulb, an electrical socket, and two electrical contacts. Locking rails are transversely disposed on two or more of the lateral faces of the lamp housing and may be received into rail guides on the mounting bracket or housing. The top of the lamp housing forms a looped handle for easier insertion and removal of the lamp to and from the bracket or housing.

The mounting bracket or housing comprises a parallelpiped shaped structure having five faces, and a front open portion into which the lamp is inserted. The mounting bracket or housing is preferably made of transparent plastic, so that the light may pass through the faces thereof. However, it may also be made of stainless steel or some other rust-free, durable material. On the interior surface of the bracket or housing are rail guides for receiving the lock rails on the external faces of the lamp housing. The mounting bracket or housing is affixed to the frame of the trailer by screws or bolts projecting through its back face. A 12-volt, double wire plug assembly is affixed to electrical contacts on the lower surface of the mounting bracket or housing. These contacts engage the contacts within the lamp portion when the lamp is inserted into the mounting bracket or housing. Hook and loop type (Velcro) fastening straps are attached to the back face of the mounting bracket or housing.

To use the invention, the wire plug assembly is connected to the automobile's trailer light fixture and the mounting bracket or housing is screwed onto the trailer frame. The lamp is then inserted into the mounting bracket or housing such that the lock rails of the lamp are received into the rail guides of the mounting bracket or housing. The fastening straps are then secured around the lamp to hold it securely in place. When so secured, the electrical contacts of the mounting bracket or housing and those of the lamp are engaged and the lamp is operational. The lamp may be quickly removed by grasping the handle and pulling it from the mounting bracket or housing.

The invention thus provides for quick and easy installation and removal, and also allows access to the electrical connections for easy cleaning. It can be used on any type of trailer and is inexpensive to manufacture.

Accordingly, it is an object of the present invention to provide an improved automotive trailer light.

It is also an object of the present invention to provide a trailer light that is inexpensive, convenient, and dependable.

It is a further object of the present invention to provide a trailer light that may be used on many different types of trailers.

It is a further object of the present invention to provide a trailer light that can be quickly installed and removed, and which provides ready access to electrical connections for cleaning and maintenance.

Finally, it is an object of the present invention to provide a trailer light having a lamp portion detachably installed in a mounting bracket or housing fixed on the exterior portion of an automotive trailer.

These and other objects and advantages of the present invention will become fully apparent from the detailed description below, when taken in conjunction with the annexed drawings.

DESCRIPTION OF THE PREFERRED EMBODIMENT

Figure 1:
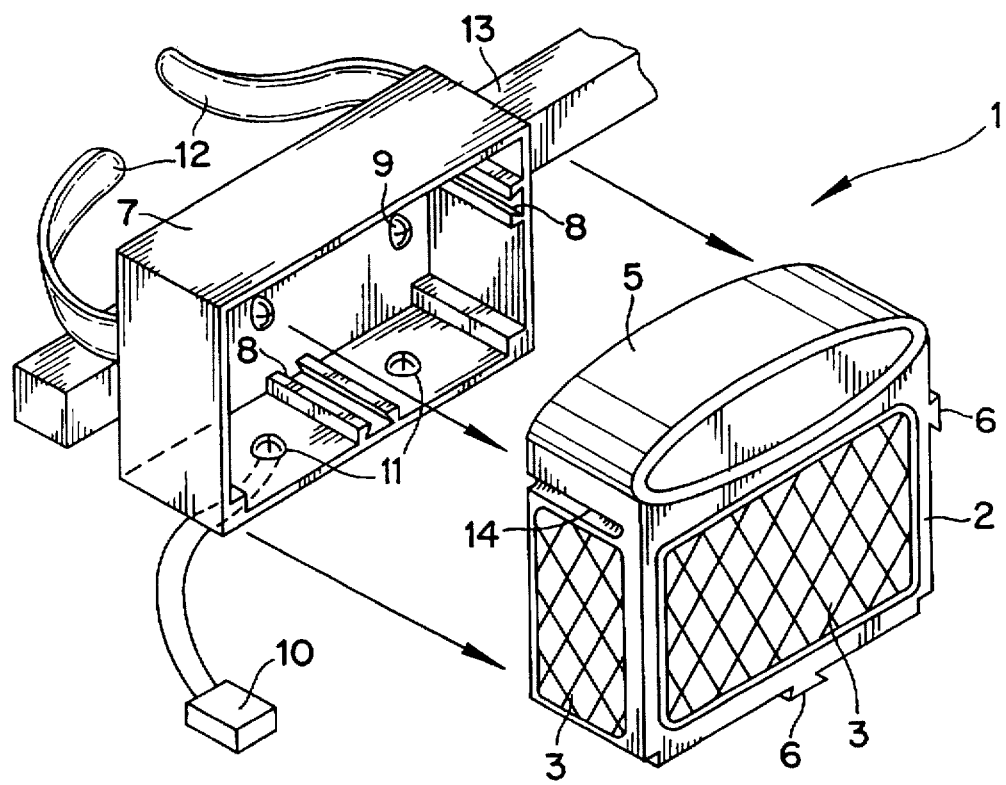
FIG. 1 shows a perspective view of the invention as installed on the frame of a trailer, with directional lines depicting the assembly of the invention.

Referring now to the drawings in greater detail, it can be seen in FIG. 1 that the present invention 1 comprises a lamp 2 and a mounting bracket or housing 7. The lamp 2 has lens faces 3 on the front and two sides, forming a generally parallelpiped shaped housing and a looped portion forming a handle 5 at the top. A slot 14 is formed between the handle 5 and the upper face of the lens faces 3.

Figure 2:
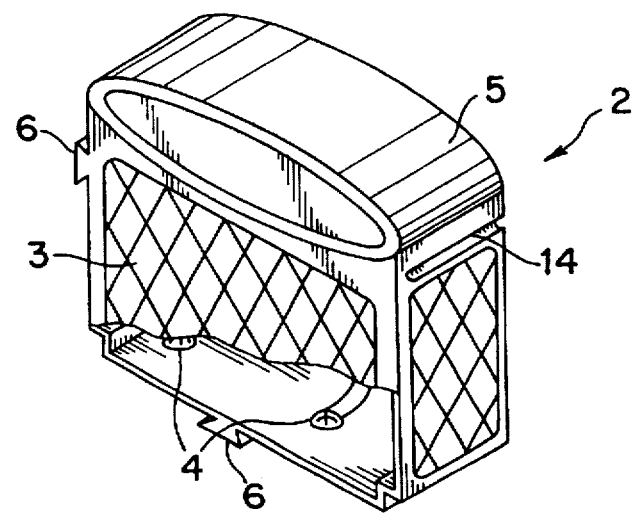
FIG. 2 shows a perspective view of the lamp portion of the present invention, with parts cut away to show the internal components thereof.

The lamp 2 contains a conventional bulb and socket (not shown) common in the art. Traversing the bottom and lateral face of the lamp 2 are locking rails 6, which extends longitudinally relative to the trailer frame 13, as seen in FIGS. 1 and 2. Also as seen in FIG. 2, the locking rails 6 are generally shaped as a male dovetail, and the female slots 8 which receive the rails 6 have a complimentary shape to receive the rails 6.

FIG. 2 shows a perspective view of the lamp 2 with portions cut away to show the internal components thereof. Electrical contacts 4 are embedded along the base of the lamp 2. When the lamp 2 is installed, as described more fully below, these contacts 4 engage contacts 11 on the mounting bracket or housing 7 to supply the lamp with electrical power.

As shown in FIG. 1, the bracket or housing 7 is a five-faced parallelpiped shaped structure having an open front portion. Securing means, shown in FIG. 1 as screws 9, protrude through the back face of the bracket or housing 7 and secure it to the trailer fame 13. On the interior faces of the bracket or housing 7 are rail guides 8, the interior portions of which correspond to the lock rails 6 on the lamp 2.

A 12-volt, dual wire connector assembly 10 is attached to electrical contacts 11 on the underside of the bracket or housing 7. The connector assembly 10 is a conventional connector that will engage with the vehicle wiring and thereby provide power to the light 2.

Closure straps 12, preferably of the hook and loop variety (Velcro) are mounted to the back face of the bracket or housing 7 by any conventional means. Although the hook and loop type closure is preferable for its convenience, other closure means may be employed without departing from the scope of the invention. For example, snap fasteners may be used.

As shown by the directional lines in FIG. 1, the lamp 2 is received by the bracket or housing 7. When so installed, the lock rails 6 of the lamp 2 are received into the rail guides 8 of the bracket or housing 7, and the slot 14 of the lamp 2 receives the uppermost face or top surface of the bracket or housing 7. In this position, the handle 5 will be positioned above and outside the top surface of the bracket or housing 7 when the lamp 2 is in its final position. Also, the electrical contacts 4 of the lamp 2, depicted in FIG. 2, engage the contacts 11 of the bracket or housing 7, supplying the socket (not shown) of the lamp 2 with electrical current from the vehicle wiring. Upon installation of the lamp 2 into the bracket or housing 7, the closure straps 12 may be wrapped around the lamp 2, holding it securely in place. The contacts 4 and 11 can be any type of conventional contact that will perform the intended function. For example, conventional butt contacts can be used for the contacts 4 and 11, although other types of contacts can be used if desired.

To use the invention 1, the wire assembly 10 is first connected to the trailer light outlet of the vehicle. The bracket or housing 7 is then secured by the screws 9 to the trailer frame 13 at the desired location. The lamp 2 is inserted into the bracket or housing 7 and secured therein with the closure straps 12. When it is desirable to remove the lamp 2, such as when one must lower the trailer into water to launch a boat, the handle 5 is grasped and the lamp 2 is simply pulled from the bracket or housing 7. This convenient removal procedure also facilitates cleaning and maintenance of the electrical contacts 4, 11, which often become soiled from road travel.

The invention 1 described herein can be inexpensively manufactured. The lamp 2, which is preferably made of translucent red plastic, is amenable to the process of injection molding. This plastic molding process utilizes heat softened plastic material which is forced under very high pressure into a metal cavity mold which is relatively cool. The inside cavity mold is comprised of two or more halves and is the same desired shape as the product to be formed. High pressure hydraulics are used to keep the mold components together during the actual injection phase of the molding process. The injected plastic is allowed to cool and harden. The hydraulics holding the multiple component cavity together are released, the halves of the mold separated and the solid formed plastic item is removed. This process can easily be automated and is capable of producing extremely detailed parts at a very cost effective price.

The bracket or housing 7 can be constructed from hard plastic, stainless steel, or any suitable rust-free material. However, it is preferable for the bracket or housing 7 to be transparent so light may pass through it. The bracket or housing 7, although suitable for injection molding manufacture, may also be constructed using a metal stamping and punching process. In this process, flat metal is shaped and formed between two parts of a die under tremendous pressure. The metal is punched, formed, and shaped to these dies many times in one process in order to form the finished product.

The electrical components of the present invention, such as the contacts 4, 11 and the bulb and socket (not shown), are commercially available items well known in the art.

Although the trailer light and the method of using the same according to the present invention has been described in the foregoing specification with considerable detail, it is to be understood that modifications may be made to the invention which do not exceed the scope of the appended claims and modified forms of the present invention done by others skilled in the art to which the invention pertains will be considered infringements of this invention when those modified forms fall within the claimed scope of the invention.

What I claim as my invention is:

1. An auxiliary light for trailers adapted to be connected to a vehicle comprising:

a housing having a back, a bottom, a top and sides, means on said back for attaching said housing to a trailer, a light assembly adapted to be inserted into said housing and having a top, a bottom and sides, said light assembly having guide means positioned on said bottom and one side, said housing having complimentary guide means which cooperates with said guide means on said light assembly to guide said light assembly into said housing, said housing having electrical contact means mounted on said bottom of said housing, said light assembly having complimentary electrical contact means mounted on said bottom of said light assembly adapted to engage said electrical contact means mounted on said bottom of said housing when said light assembly is inserted into said housing, means for electrically connecting said electrical contact means on said housing to an electrical system on said vehicle, and wherein said housing has means for securing said light assembly within said housing, and wherein said means for securing said light assembly within said housing is a pair of straps which encompass said light assembly when said light assembly is positioned within said housing.

2. An auxiliary light for trailers adapted to be connected to a vehicle comprising:

a housing having a back, a bottom, a top and sides, means on said back for attaching said housing to a trailer, a light assembly adapted to be inserted into said housing and having a top, a bottom and sides, said light assembly having guide means positioned on said bottom and one side, said housing having complimentary guide means which cooperates with said guide means on said light assembly to guide said light assembly into said housing, said housing having electrical contact means mounted on said bottom of said housing, said light assembly having complimentary electrical contact means mounted on said bottom of said light assembly adapted to engage said electrical contact means mounted on said bottom of said housing when said light assembly is inserted into said housing, means for electrically connecting said electrical contact means on said housing to an electrical system on said vehicle, and wherein said light assembly has a handle means mounted on top of said light assembly for facilitating mounting said light assembly in said housing.

3. An auxiliary light for trailers as claimed in claim 2, wherein said handle means is unitary with said light assembly.

4. An auxiliary light for trailers as claimed in claim 2, wherein said handle means remains outside said housing when said light assembly is fully mounted within said housing.

5. An auxiliary light for trailers as claimed in claim 4, wherein said light assembly has a slot in one of said sides adjacent said handle means, said slot receives a portion of said top of said housing.

* * * * *